Sept. 15, 1925.
H. M. BIEBEL
COMBINED TOASTER CARRYING AND TRAY OPERATING HANDLE
Filed April 16, 1923
1,553,358
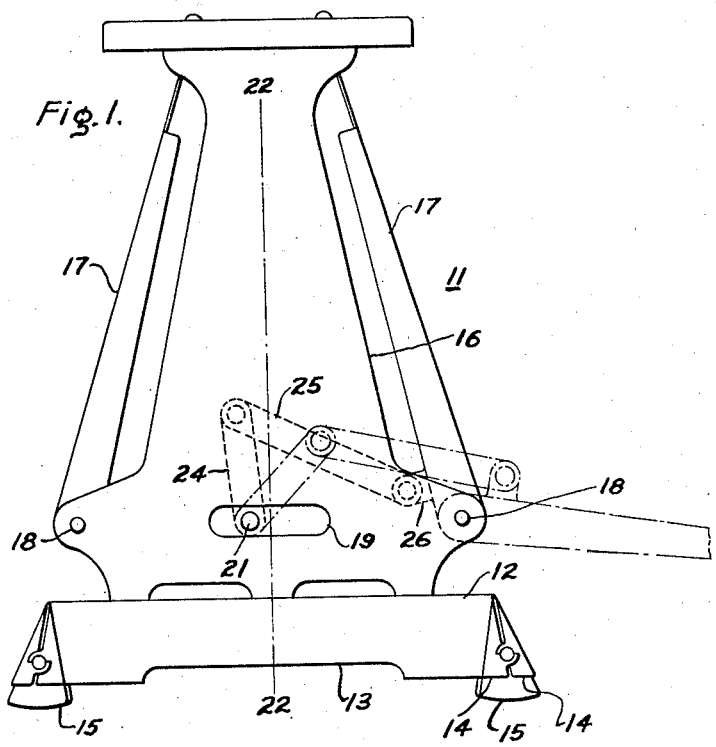
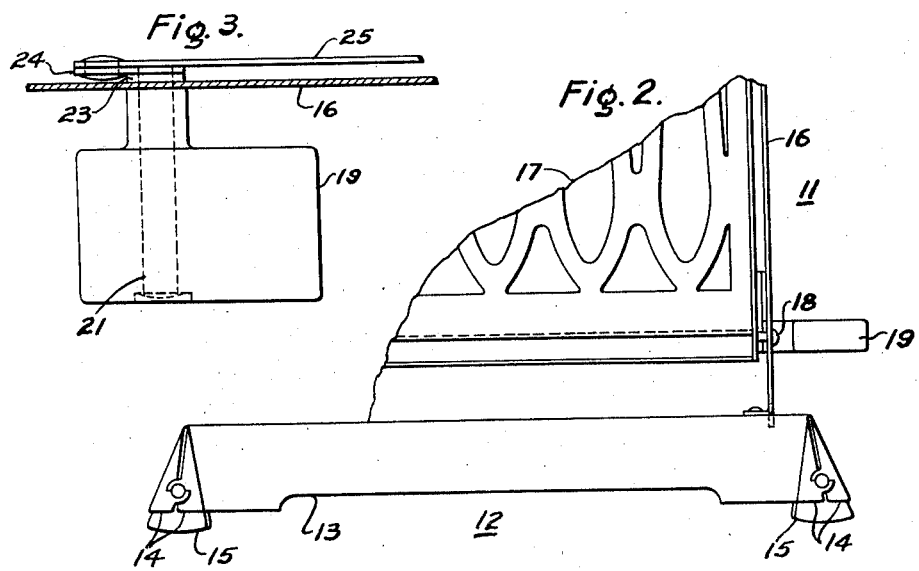
WITNESSES:
INVENTOR
Herman M. Biebel
BY
ATTORNEY Patented Sept. 15, 1925.

1,553,358

UNITED STATES PATENT OFFICE.

HERMAN M. BIEBEL, OF OAKMONT, PENNSYLVANIA, ASSIGNOR TO WESTINGHOUSE ELECTRIC & MANUFACTURING COMPANY, A CORPORATION OF PENNSYLVANIA.

COMBINED TOASTER-CARRYING AND TRAY-OPERATING HANDLE.

Application filed April 16, 1923. Serial No. 632,267.

*To all whom it may concern:*

Be it known that I, HERMAN M. BIEBEL, a citizen of the United States, and a resident of Oakmont, in the county of Allegheny and State of Pennsylvania, have invented a new and useful Improvement in Combined Toaster-Carrying and Tray-Operating Handles, of which the following is a specification.

My invention relates to electric toasters and particularly to toaster-carrying and tray-operating means.

The object of my invention is to provide a relatively simple device that will permit of carrying a table toaster and of operating the trays thereof.

In practicing my invention, I provide a knob or button of a suitable heat insulating material, pivotally mounted on one of the side frames of a table toaster of the turnover type, that is provided with a lever connected thereto and a link pivotally connecting the outer end of said lever and one of the trays of the toaster. The knob is mounted in an offset position relatively to a plane passing through the center of gravity of the toaster and in such position that when carrying the toaster, the weight of the toaster tends to maintain the tray in its closed position relatively thereto.

In the drawing,—

Figure 1 is a view in end elevation of a table toaster comprising the device embodying my invention;

Fig. 2 is a vertical view, in side elevation, thereof, and

Fig. 3 is a top plan view of a part of a toaster the parts illustrated being those more particularly embodying my invention.

An electric toaster 11 comprises a base 12 having a plurality of integral depending flanges 13. The end portions 14 of each of the flanges 13 are angularly disposed relatively to the flanges 13 and have a supporting member or foot 15 operatively engaging the inner surface thereof and suitably secured thereagainst.

A plurality of side frames 16, (only one of which is shown) are mounted in spaced relation on the top of the base 12 and extend vertically upward therefrom. A plurality of trays 17 are pivotally mounted by suitable means such as pins 18, in each of the side frames 16, suitable openings being provided in the side frames 16 to receive the pins 18. The general construction of the base, side frames, tray and of a heating element, (not shown) is more particularly disclosed and claimed in a co-pending application Serial No. 630,271, of O. A. Colby, filed April 6, 1923, and assigned to the Westinghouse Electric and Manufacturing Company. Further reference may be had to the above mentioned application for details of the parts illustrated here generally only, as they form no part of my invention.

The combined toaster-carrying and tray-operating means comprises a knob or button 19, that is pivotally mounted on the outside of one of the side frames 16, a suitable bolt or pin 21 extending through the member 19 and through a suitable opening in the side frame 16. The pin 21 is not located on the vertical plane passing through the center of gravity of the toaster and longitudinally thereof, but is located eccentric thereto, that is, if the line 22—22 represents a vertical plane, in end view, passing through the center of gravity of the toaster, the pin 21 is located at the left thereof for a purpose to be hereinafter set forth more in detail.

A washer 23 is located on the inner end of the number 21 and a lever 24 is suitably secured to the inner end of the pin 21 in fixed relation relatively thereto. A link 25 has one of its ends pivotally connected to the outer end of the lever 24 and its other end pivotally connected to an integral extension 26 constituting a part of one of the trays 17. The relative positions of the lever 24, link 25, and tray 17 is such that when the flat button 19 is in a substantially horizontal position, the tray is in its closed position substantially as illustrated in Fig. 1 of the drawing, the lever 24 and the link 25 occupying the positions illustrated by the broken lines.

When it is desired to actuate the tray to its open position, as illustrated by dot-and-dash line in Fig. 1, it is only necessary to effect a turning movement of the knob or button 19 in a clockwise direction, whereupon the lever 24 and the link 25 will occupy the positions illustrated by dot-and-dash lines in Fig. 1.

One of the knobs or buttons 19 and the parts operatively connected thereto are mounted in each of the side frames 16 whereby a toaster-carrying and tray-operating mechanism is provided on each side of the toaster making it possible to operate each tray independently of the other.

By mounting the knobs or buttons 19 eccentrically of the trays, as hereinbefore described, the weight of the toaster, while being carried by the knobs, tends to cause a turning movement of the tray in such a direction relatively to the pivotally mounted button 19 as to cause it to move in such a direction as to hold the tray connected thereto in its closed position, substantially as illustrated in Fig. 1 of the drawing.

I have not illustrated a heating element in detail nor any means for energizing the same, as the device embodying my invention may be employed with any type of heating element and of current-conducting means that may be used with a toaster of the kind in which it is desired to actuate the trays to their open and closed positions relatively thereto.

Various modifications and changes may be made herein without departing from the spirit and scope of the invention, and I desire, therefore, that only such limitations shall be placed thereon as are imposed by the prior art or as set forth in the appended claims.

I claim as my invention:

1. In a toaster, in combination, a frame, a tray pivotally supported on said frame and having an open and a closed position relatively thereto, and a combined tray-actuating and toaster-carrying means so mounted on the side of said frame as to maintain said tray in its closed position while being used as a toaster-carrying means.

2. In a toaster, in combination, a frame, a tray pivotally supported by said frame, a knob pivotally mounted on said frame eccentrically of a vertical longitudinal plane passing through the center of gravity of said toaster, a lever secured to said knob, and a link member connecting said lever and said tray to vary the angular position of said tray in accordance with the position of said knob.

In testimony whereof I have hereunto subscribed my name this 4th day of April, 1923.

HERMAN M. BIEBEL.